June 24, 1941.　　　H. G. LEHMANN　　　2,247,093
CIGAR LIGHTER
Filed Aug. 11, 1936　　　2 Sheets-Sheet 1
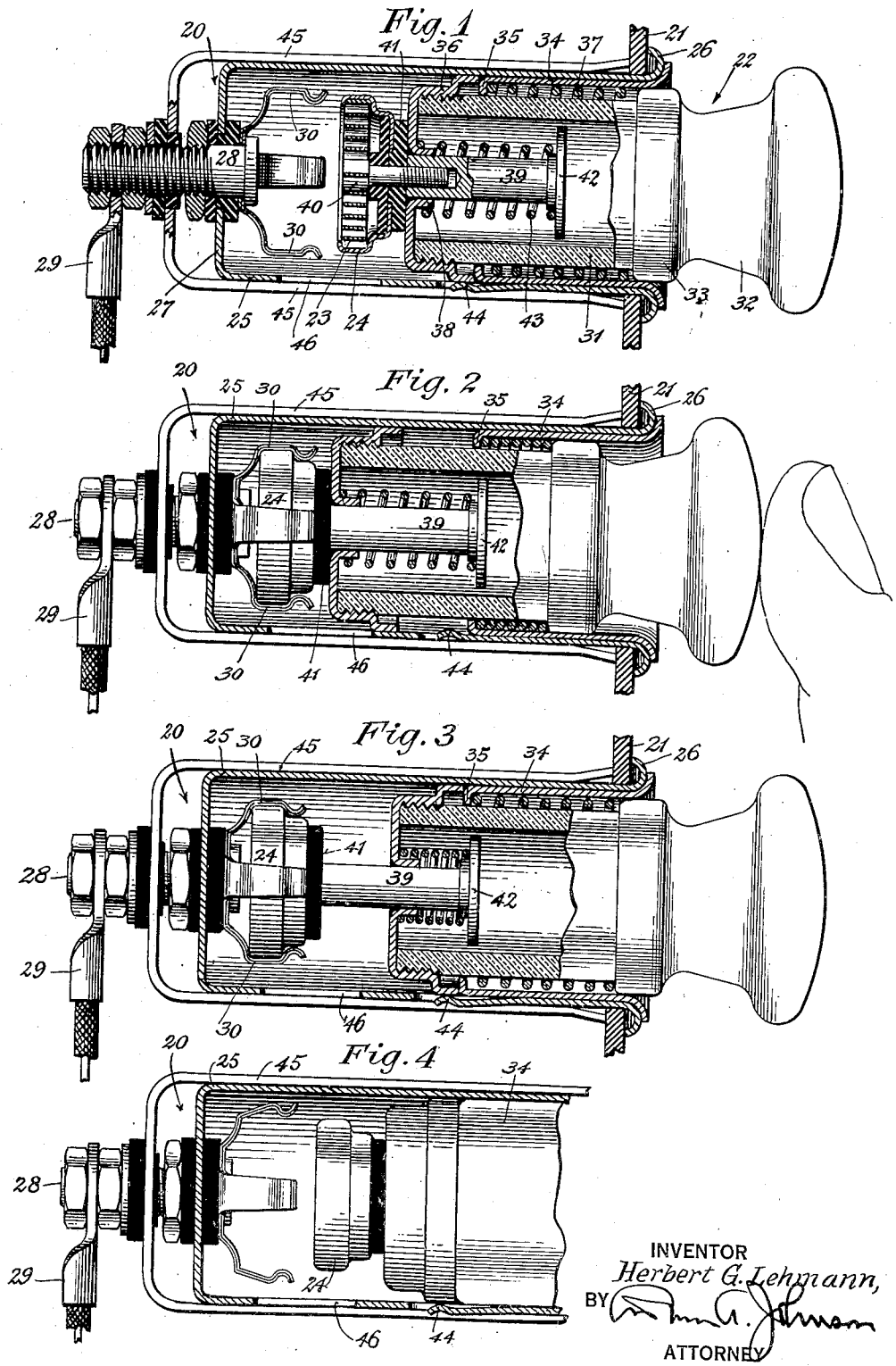
INVENTOR
Herbert G. Lehmann,
BY
ATTORNEY June 24, 1941.  H. G. LEHMANN  2,247,093
CIGAR LIGHTER
Filed Aug. 11, 1936  2 Sheets-Sheet 2
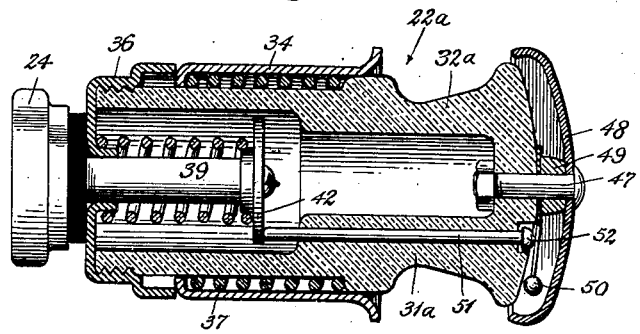
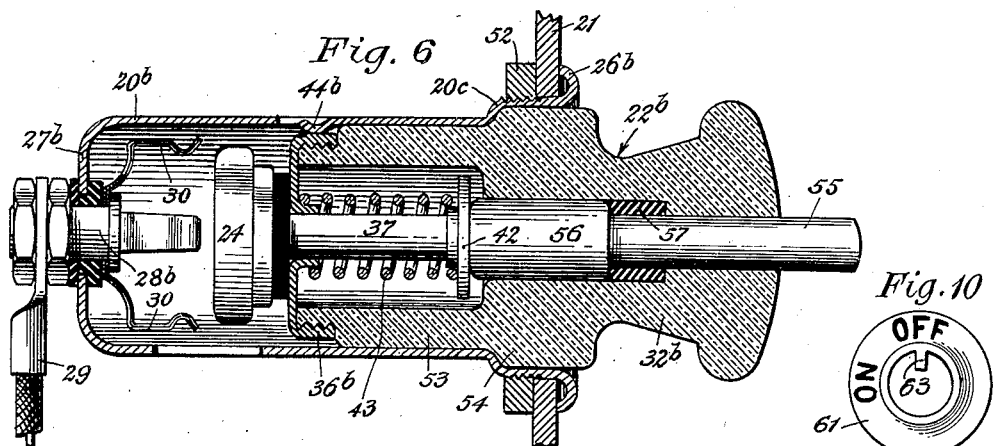
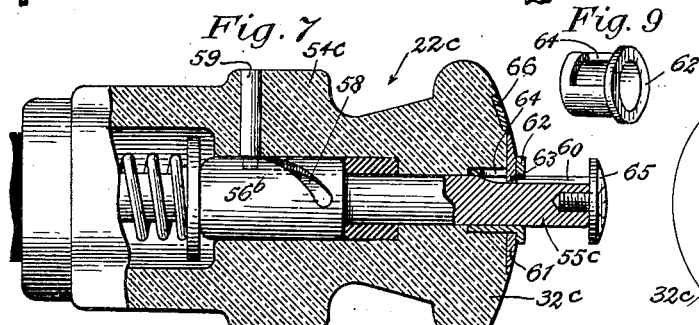
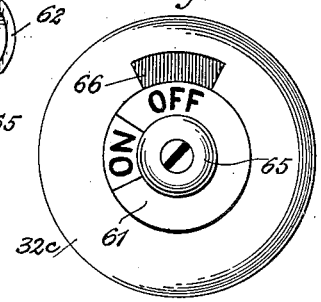
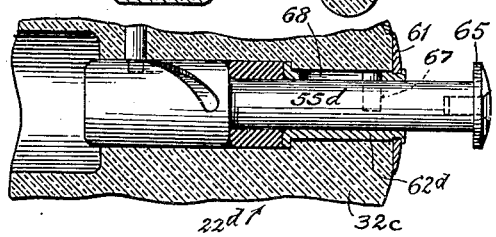
INVENTOR
Herbert G. Lehmann,
BY
ATTORNEY Patented June 24, 1941

2,247,093

UNITED STATES PATENT OFFICE 2,247,093

CIGAR LIGHTER

Herbert G. Lehmann, Bridgeport, Conn., assignor to Automatic Devices Corporation, Bridgeport, Conn., a corporation of Connecticut Application August 11, 1936, Serial No. 95,373

29 Claims. (Cl. 219—32)

This invention relates to electric cigar lighters such as are used in automobiles and the like.

Lighters such as these, whether automatic or non-automatic, are commonly provided with a holding device attachable to a support, and a separate and removable igniting unit carrying the heating element, adapted to be held in the holding device, energized therein and removed therefrom for use. Lighters of the automatic type, after being initially actuated to cause energization, operate to open automatically the heating element circuit upon functioning of a member responding to heat from said element, after which the removable igniting unit, carrying the heated element, may be removed from the holding device for use.

In prior lighters of either type, the heating element, in being carried by the igniting unit at the end thereof, at times warmed the metal parts of the unit considerably, and there was present the danger that a user might be burned should his hand inadvertently contact with such a heated metal part.

It is an object of the present invention to provide an electric cigar lighter wherein the parts of the igniting unit are kept relatively cool during and after energization of the heating element.

This object is attained by mounting the heating element on the igniting unit in a novel manner whereby said element is spaced from the unit during energization of the element.

In the specific embodiments shown the heating element is mounted on a spring-urged plunger carried by the igniting unit, the arrangement being such that the spring will normally continually maintain the heating element closely adjacent said unit, yet such that the element can be moved and maintained away from the unit while being energized. Thus during heating of the element the parts of the igniting unit will not be subjected to the intense heat from the element, and will therefore be maintained at a relatively cool temperature.

The present invention is shown as applied to lighters of the automatic type, although it should be understood that the purposes of the invention can be carried out in non-automatic lighters so that these have utility also.

According to the embodiments shown, as applied to an automatic type of lighter, the heating element is held in energizing position away from the igniting unit, and after said element reaches a certain predetermined temperature it is released, and snaps back to normal position closely adjacent the end of the igniting unit. After this return of the heating element, heating of the igniting unit is prevented by a heat-insulating washer adapted to be disposed at all times between the element and unit, and thus the unit is doubly safeguarded against heat transfer.

The sudden and abrupt movement of the heating element in snapping back against the igniting unit is calculated to serve a useful purpose in jarring loose from the heating coil any dirt or ashes which may have accumulated thereon from prior use, and this is an important feature of the invention.

In addition, this quick and sudden movement occasioned when the heating element reaches a useful temperature is further utilized, according to the invention, in a novel signal arrangement which is extremely simple and effective. In one embodiment shown the handle of the igniting unit is provided with a bell, shaped to be gripped by hand as an ordinary knob, and which may be attractively finished, the bell being sounded by a clapper actuated by a push rod in turn actuated by the plunger carrying the heating element. Thus a clear and sharp signal is given upon release of the igniting unit, to apprise a user of its usable condition, said signal also being externally located so that the sound thereof may be readily heard.

Another feature of the invention is the provision of an improved visual signal which, by means of a dial on the knob of the igniting unit, carrying the words "on" and "off," apprises a user at a glance whether or not the lighter is in energizing position. Thus the likelihood of draining an automobile battery, should the automatic release of the lighter fail to function, is materially reduced, since a clear visual indication is had at all times as to whether or not the unit is being energized.

The specific embodiments illustrated in the drawings show the invention as applied to a well-type lighter, wherein a substantially tubular holding device is mounted on a panel, said holding device having a pair of contact means connected with the energy supply for the lighter, and said holder being adapted to slidably receive and support a separate plug-like igniting unit having at its inner end the heating element mounted on a spring-urged plunger. Normally the heating element is maintained in a position closely adjacent the end of the igniting unit; however, the plunger mounting for the element is such that said element may be moved and held away from the end of the igniting unit during energization of the element.

In several of the shown embodiments the removable plug-like igniting unit carries a spring-urged outer sleeve which provides for yieldingly locating said unit on the holding device so that it may be moved relative thereto and against the urging of said spring so as to effect closed-circuit positioning of the heating element when it is desired to energize said element. One of these embodiments shows a metal bell as part of the handle of the igniting unit, the bell being sounded upon opening of the circuit through the heating element, by the movement of said element in returning to initial open-circuit position.

Other embodiments of the invention show the igniting unit as being adapted to remain in a given fixed position on the holding device; movement to energizing position of the heating element being effected by a manually operable plunger carried by the unit, which plunger operates to move the heating element away from the igniting unit and in engagement with an electrical contact. Regarding one of these latter forms of the invention, there is also provided an indicating dial actuated in response to movement of the manually operable plunger so as to indicate the "on" and "off" positions of the lighter.

Other features and advantages will hereinafter appear.

In the accompanying drawings, showing several embodiments of the invention:

Figure 1 is an axial sectional view of one embodiment of improved lighter, the igniting unit being shown partially in elevation, and being in open-circuit position on the holding device.

Fig. 2 is a view similar to that of Fig. 1, but showing the igniting unit depressed so that the circuit through the heating element is closed.

Fig. 3 is a similar view also, but showing the body of the igniting unit as having returned to its initial position upon release of the pressure thereon, the heating element however remaining in closed-circuit position.

Fig. 4 is a fragmentary axial section showing the heating element automatically released to open-circuit position in response to heat therefrom.

Fig. 5 is an axial sectional view of a modified form of igniting unit having a signal bell.

Fig. 6 is an axial sectional view of another modification of the invention wherein energization of the lighter is effected by a manually operable plunger carried by the igniting unit, which plunger moves the heating element to closed-circuit position.

Fig. 7 is a fragmentary sectional view of a modified form of igniting unit for the lighter of Fig. 6, said unit being provided with a visual signal in the form of an indicating dial operable by the plunger.

Fig. 8 is a right-end elevation of the igniting unit of Fig. 7.

Fig. 9 is a detail of the dial-supporting sleeve of the igniting unit of Figs. 7 and 8.

Fig. 10 is a front elevation of the indicating dial of Figs. 7 and 8.

Fig. 11 is a fragmentary sectional view of a modified mounting mechanism for the indicating dial of the lighter of Fig. 7.

Referring to Figs. 1 through 4, there is shown a lighter illustrating one embodiment of the present invention, wherein movement of the heating element to closed-circuit position is effected by movement of the entire igniting unit. The lighter includes a holding device 20 adapted to pass through an aperture in a panel 21 and to be supported thereby, said holding device carrying a removable igniting unit 22 provided at its inner end with a spiral coil heating element 23 mounted in a metal cup 24.

The holder 20 includes a tubular shell 25 having at its forward end a flange or bead 26 engaging the panel 21, said shell having at its rear an integral transverse wall 27. The shell 25 is preferably of metal, forming a conductive element in the grounded side of the electrical lighter circuit, and said shell is provided with a live contact by means of which the heating element 23 is energized. For supporting this live contact, the transverse wall 27 carries a headed stud 28 insulated therefrom by suitable washers as shown, said stud having a threaded shank and being secured by a nut, and said stud being connected to the energizing circuit through a connection lug 29.

The stud 28 supports a bimetallic contact and detent clip 30 which is securely held under the head of the stud, said clip being resilient and being adapted to snap over and (Fig. 3) grasp the metal cup 24 of the igniting unit so as to yieldingly hold said cup, and being also adapted to flex outwardly in response to heat from the heating element so as to release the cup (Fig. 4).

The removable igniting unit 22 includes a tubular body portion 31, the front end of which terminates in a handle and knob 32 adapted to be grasped by hand. Intermediate the knob 32 and the tubular body 31, the igniting unit is provided with a shouldered portion 33 having a diameter slightly larger than that of the body 31.

The igniting unit is yieldingly positioned in the holder 20 by a cylindrical sleeve 34 slidably fitting within the shell 25, and adapted to slidably receive the shouldered portion 33 of the unit, said sleeve surrounding the body portion of the unit. The front edge of the sleeve is outwardly flared to engage the flange 26 of the shell 25, and the remaining or rear edge of the sleeve 34 is turned inwardly to form an internal flange 35 sliding on the body 31. The rear end of the tubular body 31 is externally threaded to hold a metal cap 36, the rim of said cap being of enlarged diameter to slidably engage the flange 35. For the purpose of yieldingly holding the sleeve 34 against the cap 36, as shown in Fig. 1, the tubular body 31 carries a helical compression spring 37 disposed between the shouldered portion 33 of the body and the inwardly extending flange 35 of the shell 34.

When the igniting unit 22 is placed on the holding device in the position shown in Fig. 1, it can be depressed manually against the pressure of the spring 37, said unit returning to its initial position upon release of the pressure.

According to the present invention the heating element 23 and metal cup 24, which cup is electrically connected to the outer convolution of the heating element coil, are movably mounted on the end of the igniting unit, and are yieldingly held in a position closely adjacent said end. For this purpose, the metal cap 36 carried by the end of the unit is centrally apertured and drawn to form a cylindrical bore 38 in which is slidably carried a plunger 39. The inner end of the heating element 23 is fastened to the head of a threaded stud 40 screwed into one end of the plunger 39 so that the heating element and cup are carried by said plunger. The stud 40 carries an insulating washer 41 which is firmly held between the cup 24 and the plunger 29, said washer being adapted to electrically insulate said cup from the metal cap 36, and also to furnish heat insulation between said cup and cap.

For yieldingly holding the plunger 39 in the position shown in Fig. 1, the forward end of said plunger is provided with a shouldered head 42, and said plunger carries a helical compression spring 43 disposed between the inside of the cap 36 and the head 42, the spring 43 being weaker than the spring 37 for reasons hereinafter made clear.

In order to insure positive electrical connection between the metal cap 36 of the igniting unit and the shell 25 of the holding device, the latter is provided with a tongue 44 lanced therefrom and biased inwardly to engage said cap when in the position shown in Figs. 1 and 3.

The holding device 20 is securely held to the panel 21 by a U-shaped strap 45 closely fitting over the shell 25, the yoke of said strap being apertured to receive the stud 28 and being insulated therefrom by washers as shown, and the strap being drawn up against the panel 21 by a nut and washer on the stud.

The lighter is shown in Fig. 1 as being in normal deenergized position. When it is desired to energize the lighter, the igniting unit is depressed as in Fig. 2, so that the metal cup 24 surrounding the heating element is grasped by the bimetallic clip 30. Upon release of the manual pressure, the igniting unit will return to its initial position under the action of the spring 37, this return being accompanied by compression of the spring 43, as shown in Fig. 3, since the latter spring is weaker than the spring 37. Thus although the body of the igniting unit is returned to initial position, the heating element is still grasped by the bimetallic clip 30, and therefore energization of said element will take place. Current will flow through the lug 29, stud 28, clip 30, cup 24, heating element 23, stud 40, plunger 37, cap 36, shell 25, and thence through the panel 21 to the ground circuit of the automobile. Upon the element reaching a predetermined temperature, the heat therefrom will cause the bimetallic clip 30 to flex outwardly, or open, as in Fig. 4, and thus release the element, whereupon it will return it to its initial open-circuit position closely adjacent the end of the igniting unit because of the action of the spring 43.

It will be noted that during energization of the heating element said element is in a position away from the igniting unit, and therefore said unit is not subjected to the intense heat from the element. Also, the igniting unit will remain relatively cool even after the fully heated heating element snaps back against said unit, by virtue of the heat-insulating washer 41 disposed between said element and unit.

As already pointed out, the jarring, incidental to release and return of the heating element to initial position after said element has reached a predetermined temperature, functions to shake loose any particles of dirt adhering to said element from prior use, and therefore maintains the element in workable condition. The dirt shaken loose as a result of this jarring falls through a slot 46 in the shell 25, and therefore does not clog the lighter nor impair the working efficiency thereof.

It has been mentioned before that the present invention has utility when applied to a non-automatic type of lighter. Referring to Fig. 1, if the contact clips 30 are made of a single material rather than bimetallic as shown, so as not to respond to heat by opening, the lighter will be of the non-automatic type, and, after the initial energizing operation, the user will not be required to maintain pressure on the knob 32, but can release his pressure so that the unit assumes the position in Fig. 3. After a reasonable time the unit is removed for use, the cup 24 being pulled from the clips 30, and snapping to position adjacent the end of the unit. Or, if desired, a signaling means may be employed to apprise the user that the lighter is in condition for use, whereupon the igniting unit is removed as above.

Another embodiment of the present invention is shown in Fig. 5, wherein an igniting unit 22a is provided with audible signaling means. The igniting unit shown in this figure is similar in most details to that of Figs. 1 through 3, with the exception that the knob of the unit is made up partly of a metal bell, and that the body of the unit carries a plunger for causing the bell to be sounded.

As shown, the knob 32a of the unit is centrally apertured to receive a screw 47, said screw supporting a metal bell 48 spaced from the knob 32a of the unit by a washer 49. The screw 47 also holds a clapper 50 between the washer 49 and the knob 32a, said clapper being resilient and being adapted to be moved so as to strike and sound the bell. The body portion 31a of the igniting unit slidably carries a pin or plunger 51, the forward end of which is provided with a head 52 engaging the clapper 50, and the rearward end of which abuts the head 42 of the plunger 39 carrying the heating element.

When the igniting unit 22a is used with the holding device shown in Figs. 1 through 4, automatic release of the heating element after energization thereof and return of said element to initial position will result in the head 42 of the plunger 39 striking the pin 51, said pin in turn causing the clapper 50 to strike the bell 48 thereby to sound an audible signal so the user is apprised that the lighter is in condition for use.

Another embodiment of the present invention is illustrated in Fig. 6, wherein there is provided a lighter having an igniting unit which is held in a given fixed position on the holding device, and wherein movement of the heating element so as to effect energization thereof is effected by a manually operable member carried by the igniting unit.

As shown, the holding device is in the form of a cylindrical shell 20b having at its front end an enlarged portion 20c the front edge of which is turned outwardly and backwardly to form a circular flange 26b. The holder 20b is carried by a panel 21 so that the flange 26b engages said panel, said holder being secured to the panel by a nut 52 screwed on the enlarged portion 20c of the shell, said portion being threaded for this purpose. The shell 20b is provided at its rear with an integral transverse wall 27b which is centrally apertured to support a stud 28b insulated from said wall by suitable washers as shown, said stud being secured in place by a nut screwed thereon, and carrying an electrical connection lug 29 secured thereto by a second nut. The stud 28b carries a bimetallic contact clip 30 adapted to respond to heat by flexing outwardly so as to open.

The igniting unit 22b has a rearward tubular body portion 53, a knob portion 32b, and, intermediate said portion, an enlarged body portion 54, and said portions 53 and 54 are adapted to slidably fit in the shell portions 29b and 29c. The body portion 53 of the igniting unit is reduced at its rearward end and threaded to carry a metal cap 36b, said cap being centrally apertured and drawn to provide a cylindrical bore in which is slidably carried a plunger 37, said plunger having mounted at its end a heating element with cup 24 as shown. The heating element carried by the igniting unit 22b is yieldingly held in the position shown, closely adjacent the end of said unit, by a helical compression spring 43.

For the purpose of providing positive electrical contact between the cap 36b and the shell 29b, said shell is provided with a resilient tongue 46b lanced therefrom and biased inwardly to press against the cap.

According to this embodiment of the invention, the igniting unit 22b is centrally bored to carry a manually operable plunger 55 having an enlarged portion 56 abutting the head 42 of the plunger 37. Thus, when it is desired to move the heating element and cup 24 so that the latter will be grasped by the contact clips 30 to energize the element, the plunger 55 is depressed, causing the enlarged portion 56 thereof to move the plunger 37 and heating element against the action of the spring 43. Upon the cup 24 being grasped by the clips 30, the circuit through the heating element will be completed and energization thereof will take place. After a predetermined length of time the heat from the element will cause the clips 30 to flex and open and release the cup 34, and said element and cup will snap back under the action of the spring 43 to their initial positions, thereby opening the circuit through the element. This movement of the heating element and cup 24 will be accompanied by a distinct click which will warn the user that the igniting unit is in readiness for use, whereupon said unit may be removed from the holder.

If it is desired to muffle this click, or if it is desired to reduce the intensity of the forces on the operating members when the heating element is released to snap to its initial position, the plunger 55 may be provided with a resilient washer 57 carried within the bore of the igniting unit 22b, said washer cushioning the movement of the parts.

Another embodiment of the present invention is shown in Figs. 7, 8, 9 and 10. According to this embodiment, the igniting unit 22c is provided with a visual signal means to inform a user whether the circuit through the heating element is open or closed. The igniting unit 22c is somewhat similar to the unit 22b described above, being centrally bored to carry a manually operable plunger 55c.

According to this embodiment, however, the plunger 55c is controlled so that axial movement thereof will also cause turning thereof, and for this purpose the enlarged portion 56b of said plunger is provided with a spiral groove 58 engaging a pin 59 fixedly carried by the enlarged portion 54c of the igniting unit body. Thus, when the plunger 55c is moved axially the pin 59 engaging the groove 58 of said plunger will cause the latter to turn. The forward end of the plunger 55c is provided with a keyway 60 for the purpose of actuating an indicating dial 61, see Figs. 7, 8 and 10, said dial being rotatably carried on the front of the knob 32c of the igniting unit by means of a flanged sleeve 62 fixedly carried by said knob. The dial 61 is adapted to turn on the sleeve 62, being held thereon by engagement with the flange of said sleeve as shown, and said dial has an inwardly extending finger 63 passing through an aperture 64 in the sleeve and extending into the keyway 60 of the plunger 55c. The aperture 64 in the sleeve is sufficiently wide so that the dial 61 may turn through a quarter revolution on the sleeve, the movement of said dial being limited by engagement of the finger 63 with the edges of the aperture 64.

The dial 61 is thus keyed to the plunger 55c, said dial turning with the plunger but at the same time permitting axial movement of the latter.

As shown in Figs. 7 and 8, the plunger 55c is provided with a finger piece 65 for engagement by hand, and the knob 32c is provided with an inset 66 acting as an index marker for the dial 61.

Referring to Fig. 7, the parts are in open-circuit position, and the dial is indicating "off." When it is desired to energize the heating element, the finger piece 65 and the plunger 55c are pressed inwardly causing the heating element carried by the plunger 37 to be grasped by the metal clips 30 so that the electrical circuit through the element is completed. However, as the plunger 55c is moved inwardly it will also be caused to turn due to the pin 59 riding in the spiral groove 58, and this turning of the plunger will cause the dial 61 to turn so as to register "on" position. Thus a user will be notified that the lighter is connected for energization. When the heating element is released, upon reaching of the desired predetermined temperature, it will snap back to initial position and cause the plunger 55c to return to the position shown in Fig. 7, turning meanwhile, whereupon the dial 61 will be returned to "off" position.

A modified form of mounting for the indicating dial is shown in Fig. 11, wherein a sleeve 62d fixedly carries at its outer end the indicating dial 61, said sleeve being rotatably carried in the igniting unit 22d. The plunger 55d is provided with a pin 67 riding in a longitudinal slot 68 in the sleeve 62d and therefore, when the plunger 55d is turned during its axial movement, it will cause turning of the sleeve 62d, and turning of the indicating dial 61.

Variations and modifications may be made within the scope of this invention and portions of the improvements may be used without others.

I claim:

1. In a cigar lighter, a holding device; an igniting unit supported by and completely removable from the holding device for use; a heating element; means for yieldably mounting the heating element on the igniting unit for movement relative thereto whereby the element may be located close to or away from the end of the igniting unit; means for closing a circuit through the heating element, including means for moving the heating element relative to the igniting unit and away from the end of the igniting unit and means for holding the heating element in said position; and means for releasing the holding means upon the heating element attaining the desired heat whereby the heating element is moved to open the circuit.

2. In a cigar lighter, a holding device; an igniting unit movably supported by and completely removable from the holding device for use; a heating element; means for mounting the heating element on the igniting unit for movement relative thereto, whereby the heating element may be located close to or away from the end of said igniting unit; means for yieldingly urging the heating element to a normal position close to the end of the igniting unit; means for yieldingly urging the igniting unit to a predetermined position on the holding device; means for closing a circuit through the heating element including a contact engaged by a contact of the heating element when the heating element is moved by the movement of the igniting unit from said predetermined position; and a heat-responsive detent for holding the contacts closed and against movement when the igniting unit is moved to the predetermined position on the holding device, said heat-responsive detent releasing the contacts to open the circuit upon the heating element attaining a predetermined usable heat.

3. The invention as defined in claim 9, in which the means for mounting the heating element on the igniting unit includes a plunger carrying the element, and a guiding recess for said plunger in the igniting unit, and in which the means for yieldingly urging the element to position close to the igniting unit includes a helical spring carried by the plunger.

4. In a cigar lighter, a holding device having a pair of electrical conductors insulated from each other; an igniting unit supported by and completely removable from the holding device for use; a heating element; means for electrically connecting one of the holding device conductors to one end of the heating element when the igniting unit is on the holding device, including means for mounting the element on the end of the igniting unit for movement relative thereto from a position closely adjacent said end to a position removed from said end; and means including a bimetallic latch contact for electrically engaging a contact for connecting the other end of the heating element to the other conductor of the holding device and holding the heating element against movement when the igniting unit is moved on the holder so that the heating element is in position away from the end of said unit, said bimetallic contact disconnecting said end from the conductor in response to heat from the heating element.

5. In a cigar lighter, a holding device having a pair of electrical conductors insulated from each other; an igniting unit supported by and completely removable from the holding device for use; a heating element; means for electrically connecting one of the holding device conductors to one end of the heating element when the igniting unit is on the holding device, including means for mounting the element on the igniting unit for movement relative thereto whereby the element may be located close to or away from the end of the unit, said means including a transversely extending wall having a plunger slidably mounted therein and to which the heating element is secured; means coacting with the plunger for yieldingly urging the element close to the end of the igniting unit; means for electrically connecting the other end of the heating element to the other conductor of the holding device and for holding the heating element away from the end of the igniting unit and against the urge of the yielding means when the igniting unit is on said holding device and the heating element is positioned away from the end of the unit, said means including heat-responsive detent means for holding the heating element in said position and for releasing said element in response to heat therefrom for return under urging of said yielding means to a position close to the end of said unit so as to open the circuit through the element.

6. In a cigar lighter, a holder; an igniting unit movably mounted on the holder and completely removable for use; a heating element; means for mounting the heating element on the igniting unit for movement relative thereto whereby the element may be located close to or away from the end of the igniting unit; contact means in the holder; means for moving at least a portion of the igniting unit to carry the heating element into engagement with the contact means on the holder; means for holding the heating element in engagement with the contact while said portion of the igniting unit is moved relative thereto to position the heating element away from the end of the igniting unit; and heat-responsive means for releasing the holding means upon the heating element attaining the desired heat whereupon the circuit to the heating element is broken.

7. In a cigar lighter, a holding device; an igniting unit supported by and completely removable from the holding device for use, said igniting unit being movable on the holding device; means for yieldingly locating the igniting unit in a normal position on the holding device; a heating element carried by the igniting unit; means for mounting the heating element on the igniting unit for movement relative thereto whereby the element may be located close to or away from the unit; and means for closing a circuit through the heating element to energize the same incident to movement of the igniting unit from and back to said normal position, including heat-responsive means for holding the heating element in position away from the igniting unit, and for releasing the heating element to open the circuit therethrough in response to heat from said element.

8. In a cigar lighter, a holding device; an igniting unit supported by and completely removable from the holding device for use, said igniting unit being movable on the holding device; means for yieldingly locating the igniting unit in a normal positon on the holdng devce; a heating element carried by the igniting unit; means for mounting the heating element on the igniting unit for movement relative thereto whereby the element may be located close to or away from the unit; means for yieldingly urging the heating element to a normal position close to the igniting unit; and means for closing a circuit through the heating element to energize the same incident to movement of the igniting unit from and back to said normal position, said means including heat-responsive means for holding the heating element in position away from the igniting unit, and for releasing the heating element for return to normal position under the action of the means for yieldingly urging the element whereby the circuit through the element is opened in response to heat therefrom.

9. In a cigar lighter, a holding device having a pair of electrical conductors insulated from each other; an igniting unit supported by and completely removable from the holding device for use; a heating element; means for electrically connecting one of the holding device conductors to one end of the heating element when the igniting unit is on the holding device, including means for mounting the element on the igniting unit for movement relative thereto, whereby the element may be located close to or away from the end of the unit; means for yieldingly urging the element close to the igniting unit; manually operable means for moving the element to a position away from the end of the unit; for electrically connecting the other end of the heating element to the other conductor of the holding device; and means for holding the element in this position when the igniting unit is on the holder whereby the heating element will be maintained in the position away from the end of the igniting unit and in closed-circuit position, said means including heat-responsive means for releasing the holding means and disconnecting said end element from the conductor in response to heat from the heating element.

10. The invention as defined in claim 9, in which the manually operable means for moving the element includes a plunger carried by the igniting unit.

11. In a cigar lighter, a holding device; an igniting unit supported by and completely removable from the holding device for use; a heating element; means for mounting the heating element on the igniting unit for movement relative thereto whereby the element may be located close to or away from the unit; means for yieldingly urging the heating element to a normal position close to the igniting unit; means for closing a circuit through the heating element when the igniting unit is on the holding device and the heating element is held in a position away from the unit, including heat-responsive means for holding the heating element in position away from the igniting unit and for releasing said element in response to heat therefrom for return under urging of said yielding means to normal position so as to open the circuit through the element; an audible signaling device carried by the igniting unit; and actuating means for causing said signal to sound in response to movement of the heating element in returning to normal position.

12. The invention as defined in claim 11, in which the audible signaling device includes a bell, and in which the actuating means therefor includes a clapper for said bell.

13. In a cigar lighter, a holding device; an igniting unit supported by and completely removable from the holding device for use; a heating element; means for mounting the heating element on the igniting unit for movement relative thereto whereby the element may be located close to or away from the unit; means for yieldingly urging the heating element to a normal position close to the igniting unit; manually operable means for moving the element to a position away from the unit, said means including a plunger carried by the igniting unit; means for closing a circuit through the heating element when the igniting unit is on the holding device and the heating element is positioned away from the unit, including heat-responsive means for holding the heating element in position away from the igniting unit and for releasing said element in response to heat therefrom for return under urging of said yielding means to normal position so as to open the circuit through the element; an audible signaling device including a bell and clapper, carried by the igniting unit; and a second plunger for transmitting force from the first-named plunger to the clapper so that release of the heating element and return of said element to normal position will result in sounding of the bell.

14. In a cigar lighter, a holding device; an igniting unit supported by and completely removable from the holding device for use; a heating element; means for mounting the heating element on the igniting unit for movement relative thereto whereby the element may be located close to or away from the unit; means for yieldingly urging the heating element to a normal position close to the igniting unit; manually operable means for moving the element to a position away from the unit; means for closing a circuit through the heating element when the igniting unit is on the holding device and the heating element is positioned away from the unit, including heat-responsive latch-contact means for engaging and holding the heating element in position away from the igniting unit and for releasing said element in response to heat therefrom for return under urging of said yielding means to normal position so as to open the circuit through the element; and means for cushioning the return of the heating element to normal position.

15. In a cigar lighter, a holding device; an igniting unit supported by and completely removable from the holding device for use; a heating element; means for mounting the heating element on the igniting unit for movement relative thereto whereby the element may be located close to or away from the unit; and means for closing a circuit through the heating element when the igniting unit is on the holding device and the heating element is positioned away from the unit, including means responsive to heat from the heating element for opening the circuit when the heating element reaches a predetermined temperature; a visual signal having "off" and "on" indicia carried by the igniting unit, for indicating off and on positions; and actuating means for causing said signal to register upon movement of the heating element to one or the other of its positions.

16. The invention as defined in claim 15, in which the visual signal includes a dial rotatably carried by the igniting unit, the rotative positions of which are indicative of the position of the heating element relative to the igniting unit.

17. The invention as defined in claim 15, in which the visual signal includes a dial rotatably carried by the igniting unit, the rotative positions of which are indicative of the position of the heating element relative to the igniting unit, and in which the actuating means for the dial includes a plunger movably carried by the igniting unit, and operatively connected for axial movement with the means for mounting the heating element, and includes means for causing the plunger to turn simultaneously with movement thereof in an axial direction, and also includes means for causing the dial to turn simultaneously with turning of the plunger.

18. The invention as defined in claim 15, in which the visual signal includes a dial rotatably carried by the igniting unit, the rotative positions of which are indicative of the position of the heating element relative to the igniting unit, and in which the actuating means for the dial includes a plunger movably carried by the igniting unit, and operatively connected for axial movement with the means for mounting the heating element, said plunger having an axial groove therein and a helical groove therein, and includes a pin carried by the igniting unit engaging one of said grooves, and also a pin carried by the dial engaging the other of said grooves.

19. In a cigar lighter, a holding device; an igniting unit supported by and completely removable from the holding device for use; a heating element; means for mounting the heating element on the igniting unit for movement relative thereto, whereby the element may be located close to or away from the unit; and means for closing a circiut through the heating element when the igniting unit is on the holding device and the heating element is positioned away from the unit, including means responsive to heat from the heating element for opening the circuit when the heating element reaches a predetermined temperature; visual signal means carried by the igniting unit, including a dial and a plunger operatively connected therewith, for indicating the position of the heating element relative to the igniting unit.

20. In a cigar lighter, a holding device; an igniting unit supported by and completely removable from the holding device for use; a heating element; means for mounting the heating element on the end of the igniting unit for movement relatively thereto, whereby the element may be located close to or away from said end; means for yieldingly urging the heating element to a normal position close to the end of the igniting unit; means for closing a circuit through the heating element when the igniting unit is on the holding device and the heating element is positioned away from the end of the unit, including means for holding the heating element in said position away from said end; and automatically operative means for releasing said element for return under the urging of said yielding means to normal position close to the end so as to open the circuit through the element, after the igniting unit is ready for use.

21. In a cigar lighter, a holding device; an igniting unit supported by and completely removable from the holding device; a heating element; means for mounting the heating element on the end of the igniting unit for movement relative thereto, whereby the element may be located close to or away from said end; means including detent means for closing a circuit through the heating element when the igniting unit is on the holding device and the heating element held by the detent means in a position away from the end of the unit; and automatically operative means for releasing the detent means and opening the circuit after the igniting unit is ready for use.

22. In a cigar lighter, a holding device; an igniting unit supported by and completely removable from the holding device for use, said igniting unit being movable on the holding device; means for yieldingly locating the igniting unit in a normal position on the holding device; a heating element carried by the igniting unit; means for mounting the heating element on the igniting unit for movement relative thereto whereby the element may be located close to or away from the unit; means for closing a circuit through the heating element to energize the same incident to movement of the igniting unit from and back to said normal position, including means for holding the heating element in position away from the igniting unit; and automatically operative means for releasing the heating element to open the circuit therethrough after the igniting unit is ready for use.

23. In a cigar lighter, a holding device; an igniting unit supported by and completely removable from the holding device for use, said igniting unit being movable on the holding device; means for yieldingly locating the igniting unit in a normal position on the holding device; a heating element carried by the igniting unit; means for mounting the heating element on the igniting unit for movement relative thereto whereby the element may be located close to or away from the unit; means for yieldingly urging the heating element to a normal position close to the igniting unit; means for closing a circuit through the heating element to energize the same incident to movement of the igniting unit from and back to said normal position, said means including means for holding the heating element in position away from the igniting unit; and automatically operative means for releasing the heating element after the igniting unit is ready for use for return to normal position under the action of the means for yieldingly urging the member whereby the circuit through the heating element is open.

24. The invention as defined in claim 23, in which the igniting unit includes a bell, and in which there is means for sounding the bell when the heating element is released and returned to its normal position.

25. The invention as defined in claim 23, in which the igniting unit has a visual signal comprising a dial, and in which there is means for rotating said dial in response to movement of the heating element relative to the igniting unit so that the position of said element is indicated by the dial.

26. In a cigar lighter, a holding device; an igniting unit supported by and completely removable from the holding device for use; a heating element having a contact; means for yieldably mounting the heating element on the igniting unit for movement relative thereto; contact means for engaging the contact for the heating element and establishing a circuit thereto when the heating element is moved into circuit-closing position; means for holding the heating element contact in engagement with the contact means while the igniting unit is moved relatively to the heating element; and heat-responsive means for releasing the holding means whereby the heating element is free to move out of engagement with the contact means and open the circuit.

27. The invention as defined in claim 15, in which the igniting unit has a portion of enlarged diameter adapted to fit within the enlarged bore of the holding device when the unit is replaced therein, and engage the sloping wall of the latter to position the unit.

28. In a cigar lighter, a holding device; an igniting unit supported by and completely removable from the holding device for use, said igniting unit being movable on the holding device; means for yieldingly locating the igniting unit in a normal position on the holding device; a heating element carried by the igniting unit; means for mounting the heating element on the igniting unit for movement relatively thereto whereby the element may be located close to or away from the unit; means for yieldingly urging the heating element to a normal position close to the igniting unit; means for closing the circuit through the heating element to energize the same incident to movement of the igniting unit from and back to said normal position, said means including means for holding the heating element in position away from the igniting unit; means for automatically releasing the heating element after a predetermined lapse of time for return to normal position; a bell carried by the igniting unit; and means for causing the bell to sound when the heating element returns to its normal position.

29. In a cigar lighter, a holding device; an igniting unit movably supported by and completely removable from the holding device for use; a heating element, said heating element being mounted on the igniting unit and normally biased to a position adjacent the end of the igniting unit and movable to a position away from said end; means for closing a circuit through the heating element including means for holding the heating element and moving it away from said normal position as the igniting unit is moved outwardly of the holder; and means for releasing the holding means upon the heating element attaining a desired usable heat whereupon the biasing means moves the heating element to open the circuit.

HERBERT G. LEHMANN.